United States Patent [19]
Douglas

[11] Patent Number: 5,365,786
[45] Date of Patent: Nov. 22, 1994

[54] WHEEL BALANCING APPARATUS AND METHOD

[75] Inventor: Michael W. Douglas, St. Peters, Mo.

[73] Assignee: Hunter Engineering Company, Bridgeton, Mo.

[21] Appl. No.: 893,768

[22] Filed: Jun. 5, 1992

[51] Int. Cl.$^5$ .............................................. G01M 1/08
[52] U.S. Cl. ...................................... 73/462; 73/468; 301/5.21
[58] Field of Search ................... 73/462, 468, 470; 301/5.21, 5.22; 364/463, 506, 507, 508

[56] References Cited

U.S. PATENT DOCUMENTS

| | | | |
|---|---|---|---|
| 3,550,455 | 12/1970 | Green et al. | 73/483 |
| 4,068,532 | 1/1978 | Green et al. | 73/462 |
| 4,193,304 | 3/1980 | Hofmann | 73/462 |
| 4,776,215 | 10/1988 | Curchod | 73/1 B |
| 4,903,398 | 2/1990 | Sakamoto et al. | 73/468 |

*Primary Examiner*—Hezron E. Williams
*Assistant Examiner*—Helen C. Kwok
*Attorney, Agent, or Firm*—Polster, Lieder, Woodruff & Lucchesi

[57] ABSTRACT

Balancing a wheel and tire assembly includes sensing imbalance of a wheel and tire assembly and determining therefrom the magnitude and placement of at least one correction weight to correct the imbalance. The magnitude of the correction weight is compensated to correct for curvature of actual correction weights. The compensated magnitude is displayed to the user. If the weight amount or placement spot is inconvenient for the user, the user can initiate a split weight procedure which determines a pair of weight magnitudes and weight placements which are vectorially equivalent to the corresponding single correction weight in terms of correcting imbalance. The pair of weight magnitudes are reverse compensated for curvature to calculate the effective weights thereof and the weight placements are calculated based upon the effective weights.

24 Claims, 2 Drawing Sheets

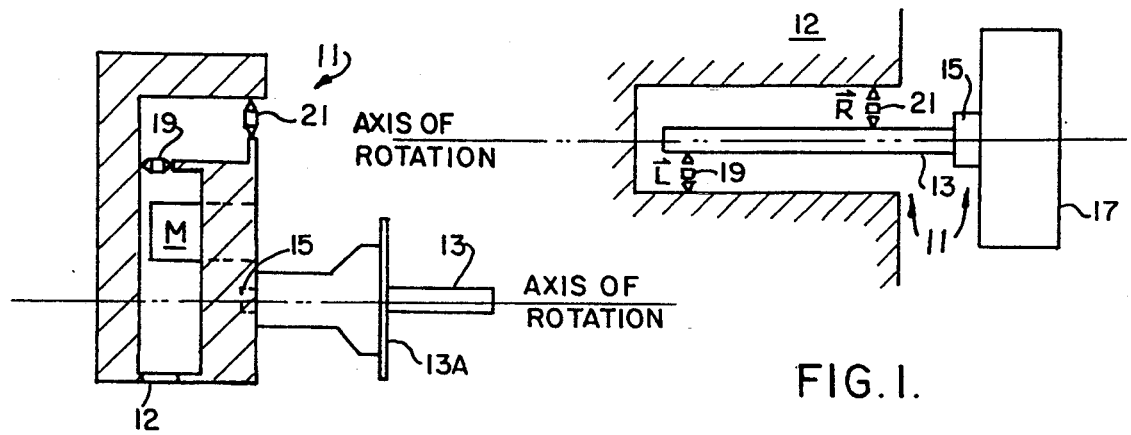
FIG. 1.
FIG. 2.
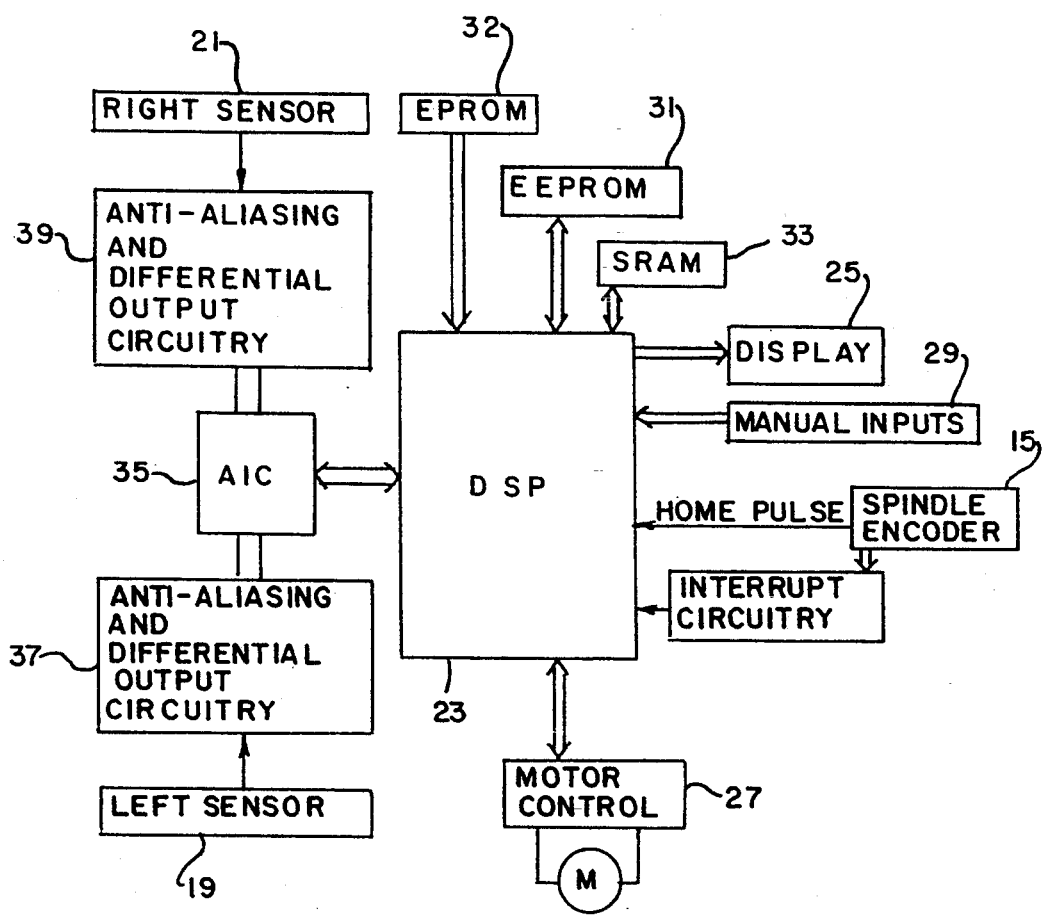
FIG. 3.

WHEEL BALANCING APPARATUS AND METHOD

BACKGROUND OF THE INVENTION

This invention relates generally to analyzing imbalance of a rotating vehicle wheel and in particular to determine the magnitude and angular location of corrective counter-balance mass(es) to be placed on the wheel rim(s).

The determination of unbalance in vehicle wheels is carried out by an analysis with reference to phase and amplitude of the mechanical vibrations caused by rotating unbalanced masses in the wheel. The mechanical vibrations are measured as motions, forces, or pressures by means of transducers, which convert the mechanical vibrations to electrical signals. Each signal is the combination of fundamental oscillations caused by the imbalances, and noise.

It is well known in the art that a variety of types of correction weights are available for placing on the wheel to correct the measured imbalance. For example, both adhesive-backed weights and hammer-on weights are available from a number of different manufacturers. These weights come in discrete units, such as ¼ ounce, ½ ounce, 1 ounce, etc. which do not always correspond to the desired corrective weight magnitude. Many systems have been designed to compensate in some way for the limitations of the correction weights available.

For instance, U.S. Pat. No. 4,891,981 to Schonfeld calculates a different angle than the optimal angle for each plane in order to use the exact incremental size weights. A larger or smaller weight circle is tried for each plane (by the CPU). The best of four calculated combinations is displayed to exactly cancel static and reduce to an "accepted" minimum dynamic residual unbalance.

U.S. Pat. No. 4,759,217 to Brihier et al. discloses a calibration process of measuring with two weights on two planes at an angle, then moving them and re-measuring, allegedly without any need to know width, diameter, or reference distance.

U.S. Pat. No. 4,348,885 to Mueller describes a calibration method which uses an add-on clamping fixture with known geometry and mass locations to eliminate the need to enter parameters.

U.S. Pat. No. 4,193,304 to Hofmann concerns a system for wheel balancing which provides a "correction value" step to account for the center of mass location of the correction weight. That is, it appears to compensate for the difference between the nominal value of the balancer's weight circle and the true weight circle.

U.S. Pat. No. 4,068,532 to Green et al. relates to a wheel balancer which uses a single size weight for balancing.

U.S. Pat. No. 3,890,845 to Muller describes a balancing system with 120/60 degree placement of test weights and the removal of material for balancing rotors.

U.S. Pat. No. 3,550,455 to Green et al. is directed to a single weight value system of fanning the weights on a gravity system.

And U.S. Pat. No. 3,251,230 to Green et al. relates to a slidable test weight.

None of these prior patents mention anything about weight curvature and how that curvature affects the effective weight of the corrective weight.

A system which addresses some of these concerns is shown in co-assigned U.S. patent application Ser. No. 07/824,999, filed Jan. 24, 1992, the disclosure of which is incorporated herein by reference. The system of said patent application solved many of the problems caused by the discrete nature of the available correction weights, but even that system can be improved.

For example, it has been found that larger weights, whether adhesive or hammer-on, have an effective weight (the weight actually measured by the force pickups) different than the actual or applied weight. This effect is caused by the curvature of the weight, which becomes pronounced for larger weights. Curvature of the weight shifts the center of gravity (cg) of some weight towards the center of the wheel. Take a three oz. weight which actually does weigh precisely three oz. When that three oz. weight is placed on a 14" wheel which has previously been balanced to zero, the wheel balancer will show (for example) 2.92 oz. imbalance due to the application of that weight instead of the three oz. which was actually applied. Furthermore, the 2.92 oz. imbalance cannot be corrected by applying another weight, trimmed to 2.92 oz., because the 2.92 oz. weight has an effective weight of 2.82 oz. or so.

The problem is more severe the larger the imbalance. A 3.75 oz. weight will read 3.60. If the machine (the balancing apparatus) has a rounding mode enabled (which, for example, rounds to the nearest 0.25 oz.), the correction weight will be shown as 3.5 oz. Similarly, if the actual imbalance is 3.6 and the machine rounds the display to 3.5 oz., the user will apply a 3.5 oz. weight. Unfortunately, because of the center of gravity/curvature effect, the effective weight of that 3.5 oz. weight is about 3.38 oz. The user should have applied a 3.75 oz. weight. There will be almost 0.22 oz. residual imbalance (3.6–3.38).

The smaller the diameter rim, the more severe is this effect because of the greater curvature (the weights bend quite easily to conform to the rim).

Unfortunately, none of the patents listed above or the patent application appear to address this center of gravity/curvature problem which occurs with larger weights and smaller diameter wheels.

SUMMARY OF THE INVENTION

Among the various objects and features of the present invention is a wheel balancer with improved performance.

Another object is the provision of such a wheel balancer which takes into account the errors introduced by correction weight curvature.

A third object is the provision of such a wheel balancer with increased accuracy.

A fourth object is the provision of such a wheel balancer with improved performance.

Other objects and features will be in part apparent and in part pointed out hereinafter.

Briefly, in a first aspect an apparatus of the present invention for balancing a wheel and tire assembly includes transducers for sensing imbalance of a wheel and tire assembly and circuitry responsive to the sensing transducers for determining the magnitude and placement of at least one correction weight to correct the imbalance. The circuitry compensates the magnitude of the correction weight to correct for curvature of actual applied correction weights. A display is provided for displaying to the user the compensated magnitude of the correction weight.

In a second aspect of the present invention, the apparatus for balancing a wheel and tire assembly includes transducers for sensing imbalance of a wheel and tire assembly, circuitry for determining the magnitude and placement of at least a single correction weight to substantially correct the imbalance, and a device for providing a split weight signal to the determining circuitry. The determining circuitry is responsive to the split weight signal to determine for the single correction weight a pair of weight magnitudes and weight placements which are vectorially equivalent to the corresponding single correction weight in terms of correcting imbalance. The determining circuitry compensates the pair of displayed incremental sized weight magnitudes and weight placements to correct for curvature of the pair of said correction weights.

A first method of the present invention includes the steps of sensing imbalance of a wheel and tire assembly, determining from the sensed imbalance the magnitude and placement of at least one correction weight to correct the imbalance, compensating the magnitude of the correction weight to correct for curvature of actual applied correction weights, and displaying to the user the compensated magnitude of the correction weight to enable the user to place a correction weight of the compensated magnitude on the wheel and tire assembly.

A second method of the present invention includes the steps of sensing imbalance of a wheel and tire assembly, determining the magnitude and placement of at least a single correction weight to substantially correct the imbalance, and determining for the single correction weight a pair of weight magnitudes and weight placements which are vectorially equivalent to the corresponding single correction weight in terms of correcting imbalance. The pair of weight magnitudes and weight placements used by the CPU in the split-weight procedure are corrected for curvature of the pair of displayed incremental sized correction weights.

BRIEF DESCRIPTION OF THE DRAWINGS

FIG. 1 is a diagrammatic view illustrating a generic wheel balancer suitable for use with the present invention;

FIG. 2 is a simplified top plan view illustrating the preferred embodiment of the wheel balancer of the present invention;

FIG. 3 is a block diagram illustrating the electrical circuitry of the wheel balancer of FIG. 1 or FIG. 2;

Similar reference characters indicate similar parts throughout the several views of the drawings.

DESCRIPTION OF THE PREFERRED EMBODIMENT

Figure 4:
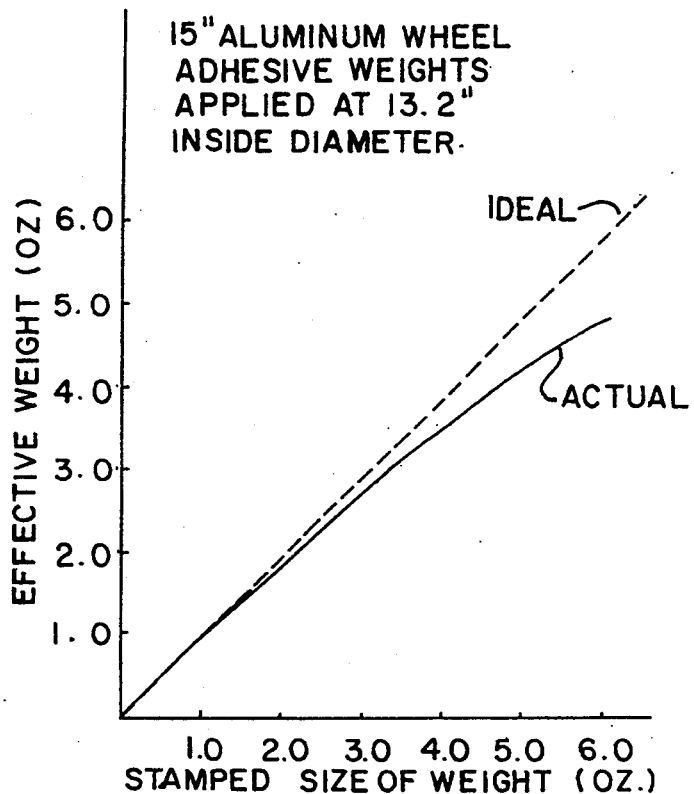
FIG. 4 is a graphical representation of the variation of effective weight from actual weight for a 15" aluminum wheel with adhesive weights applied at a 13.2" inside diameter.
Figure 5:
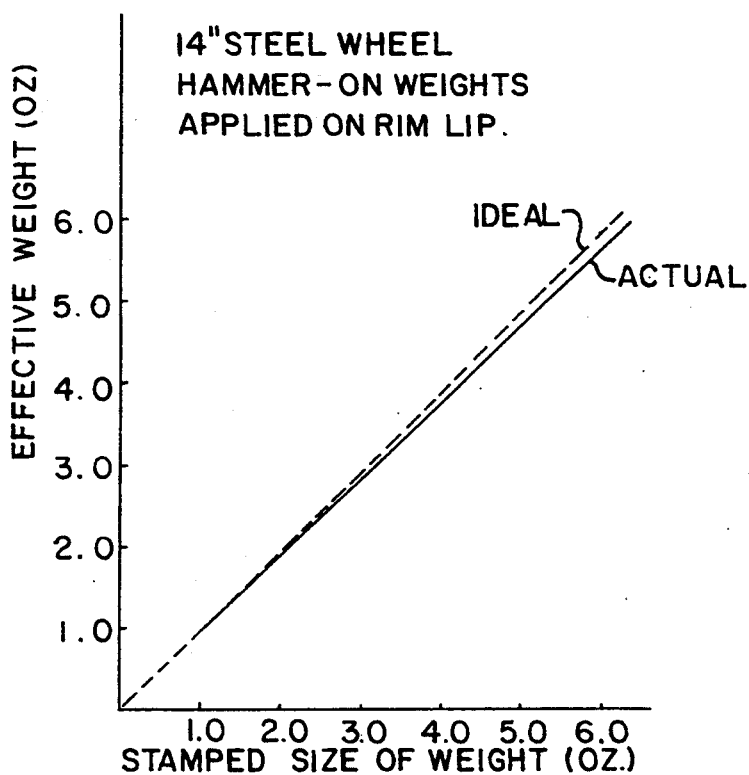
FIG. 5 is a graphical representation of the variation of effective weight from actual weight for a 14" steel wheel with hammer-on weights applied on the rim lip.

Turning to the drawings, FIG. 1 illustrates (in simplified form) the mechanical aspects of a generic wheel balancer 11 suitable for the present invention. Balancer 11 includes a rotatable shaft or spindle 13 driven by a suitable drive mechanism such as an electric motor M (FIG. 2). Mounted at one end of shaft spindle 13 is a conventional quadrature phase optical shaft encoder 15 which provides speed and rotational position information to the circuitry of FIG. 3.

During the operation of wheel balancing, at the other end of spindle 13, a wheel/tire assembly 17 under test is removably mounted for rotation with spindle hub 13A. To determine wheel/tire assembly imbalance, the balancer includes at least a pair of piezoelectric transducers 19 and 21 (or other suitable sensors such as strain gauges) coupled to spindle 13 and mounted on the balancer base 12. For ease of reference herein, sensor 19 is referred to as the "L" sensor and sensor 21 is referred to as the "R" sensor.

Turning to FIG. 2, it can be seen that the actual construction of the mechanical aspects of balancer 11 can take a variety of forms. For example, spindle 13 can include a hub 13A against which wheel/tire assembly 17 abuts during the balancing procedure. Moreover, sensor "L" and sensor "R" need not directly abut spindle 13. For example, various arms or rods as shown in FIG. 2 can be used to mechanically couple the sensors to the spindle so that they are exposed to the vibrations of the spindle.

When wheel/tire assembly 17 is unbalanced, it vibrates in a periodic manner, and these vibrations are transmitted to spindle 13. The "L" and "R" sensors are responsive to these vibrations of the spindle. Specifically, they generate a pair of analog electrical signals corresponding in phase and magnitude to the vibrations of the spindle at the particular transducer locations. These analog signals are input to the circuitry of FIG. 3.

Turning to FIG. 3, wheel balancer 11 includes not only the "L" and "R" sensors, and spindle encoder 15, but also a digital signal processing (DSP) chip 23. Preferably DSP chip 23 is an Analog Devices model ADSP-2105. For a discussion of the use of DSP chips in wheel balancers, reference is made to co-pending U.S. application Ser. No. 07/594,043, the disclosure of which is incorporated herein by reference.

DSP chip 23 performs signal processing on the output signals from the "L" and "R" sensors as described below. In addition it is connected to and controls a display 25 which provides information to the user, controls motor M through conventional motor control circuitry 27, and keeps track of the spindle position from encoder 15. More specifically, encoder 15 is a 128 count, two channel quadrature encoder which is fully decoded to 512 counts per wheel revolution by DSP chip 23.

Balancer 11 also includes manual inputs 29 (such as a keyboard and parameter input data dials) which are also connected to DSP chip 23. Manual inputs would include the wheel diameter (which input can be interactive) and a "split-weight" command signal, described below. By using DSP chip 23, no general purpose computer or microprocessor is needed for balancer 11. Chip 23 has sufficient capacity to control via software all the operations of the balancer. The DSP chip is connected to EEPROM memory 31, EPROM memory 32, and static RAM (SRAM) memory 33. The EEPROM memory is used to store non-volatile information, such as programmed units of weight, balance sensitivity setting, calibration values, etc., while the DSP chip uses SRAM 33 for storing temporary data.

DSP chip 23 is also connected to an analog input circuit (AIC) 35 which is preferably a Texas Instruments TLC32040 type device. AIC 35 is a fourteen (14) bit, two channel A/D converter with serial interface, and an on-board voltage reference. It is software programmable (via the serial interface) to have a gain of one, two or four, for a total dynamic range of sixteen (16) bits.

The signals from the "L" and "R" sensors are supplied through anti-aliasing and differential output circuitry 37, 39 to AIC 35. More specifically, the output signals from left and right force transducers 19 and 21 are each fed through unity gain buffers (not shown but well known in the art), to anti-aliasing filters making up part of circuitry 37, 39. Sallen/Key type low pass Butterworth filters function well for this purpose. (For a discussion of aliasing, reference is made to the aforementioned co-pending application.) The outputs of the anti-aliasing filters are fed into simple differential output converter circuits of conventional design. Then the differential outputs of circuits 37, 39 are fed into the differential inputs of AIC 35.

For a detailed discussion of the operation of the wheel balancer of FIGS. 1-3, reference should be made to co-pending U.S. application Ser. No. 07/829,983 to Parker et al., the disclosure of which is incorporated herein by reference.

It has been found that the wheel balancer of FIGS. 1-3 can compensate for the curvature of correction weights using extremely simple, linear equations. The compensation equations were found empirically by weighing and applying weights to balanced wheels of various diameters.

The empirical data for adhesive type weights (see FIG. 4 for an example) shows that the effective weight curves non-linearly away from ideal above four oz., and does so to more degree the larger the weight applied. This makes sense since the weights are being applied further and further up the rim the larger the adhesive strip. A straight line compensation is perfectly adequate, however, even though the variation is roughly linear only up to four ounces, for two reasons. Beyond four oz. the weight strip becomes rather long (over seven inches of weights) and the user will apply six ounces (for example) as two rows of three oz. weights, side by side, which brings the sizes down within the linear compensation area of the chart. Moreover, the wheel balancer of FIGS. 1-3 preferably includes the split weight option for when the weights are large. This split weight option is described in detail in co-pending U.S. patent application Ser. No. 07/824,999, filed Jan. 24, 1992, the disclosure of which is incorporated herein by reference. When the split weight option is used, it brings the two split weights down to sizes which fall on the straight line region of the curve.

It has also been discovered that for sufficiently small weights, no center of gravity/curvature compensation is required. For example, inspection of FIG. 4 reveals that below 0.5 oz. no compensation is required for adhesive mounted weights. These weights need compensation only from 0.5 oz. and up. It so happens that compensation is required for adhesive mounted weights at smaller weight magnitudes than for hammer-on weights because the effect of curvature is seen at smaller sizes for these weights than for hammer on weights. The adhesive mounted weights are thinner (longer per unit mass) and are applied at smaller diameters (inside of wheels) than hammer-on weights.

The compensation equation (stored in memory for use as required by DSP 23) for an adhesive weight at 13.2" inside diameter (based on a typical adhesive weight application for a 15" aluminum wheel) is:

$$\text{Weight-with-curve} = (\text{stamped size} - 0.5 \text{ oz}) * 1.082 + 0.5 \text{ oz}$$

Of course, the present invention is not limited to adhesive mounted weights. It is also useful with hammer-on weights. Hammer-on weight manufacturers produce the larger weights thicker as the sizes increase in an effort to minimize the weight's length. Because of this effort by the manufacturers, the empirical data for these shows that a simple straight line compensation works perfectly through the entire range of available weights.

Hammer-on weights need no compensation up to 1.25 oz. simply because no substantial curving happens until this size. The compensation equation for a hammer-on weight at 14" diameter is:

$$\text{Weight-with-curve} = (\text{stamped size} - 1.25 \text{ oz}) * 1.0526 + 1.25 \text{ oz}$$

For versatility, similar equations are stored in memory for the gram weights.

Because the amount of compensation needed varies with wheel diameter, a different fraction or correction factor (1.0526 in the above example) is selected as a function of diameter in increments of one inch window. It has been found that any finer increment of diameter provides little benefit.

To provide the proper correction factors, the user dials in (through manual inputs 29) the wheel diameter and whether the weight in question is a hammer-on weight or an adhesive weight. The straight line compensation for that combination of wheel diameter and weight type is then applied by DSP 23.

Naturally, a more complex (polynomial approximation) compensation equation having inputs of applied diameter and weight geometry could be used without deviating from the spirit of the invention. Testing showed, however, that a simple straight line compensation from empirical data works extremely well.

In addition to variations due to wheel diameter and overall weight type (adhesive or hammer-on), there are also variations in the required compensation due to differences in weights within a class from manufacturer to manufacturer. There are several different manufacturers for weights. Testing revealed very slight but nevertheless finite differences in the required curvature compensation for different brands. Although there is some such differences in hammer-on weights, the differences between adhesive weight manufacturers is much greater. These weights come in 0.25 oz. increments, attached to each other in break-away strips of typically three oz. total (12 pieces). Brand A was found to be very accurate on actual weight (0.25 oz. stamped size piece really weighs 0.25 oz.), but brand B weights actually weighted consistently 20% light.

The following alternative method allows the user to use any brand weight he wishes and the DSP 23 compensates for any anomalies of that brand:

HAMMER ON WEIGHT PROCEDURE

1) Enter the weight curve calibration program for hammer-on weights from the key pad.
2) Mount a wheel, dial in the dimensions, and press (start). The wheel does not have to be balanced.
3) After the wheel stops, apply a 1.00 oz. weight anywhere on the inner rim lip and press (start).

4) After the wheel stops, remove the 1.00 oz. weight and apply a 3.00 oz. weight in its place and press (start). The balancer calculates the compensation factors required and returns to the normal balancing mode automatically.

5) Remove the 3 oz. test weight.

ADHESIVE WEIGHT PROCEDURE

1) Enter the weight curve calibration program for adhesive weights from the key pad. The display will prompt for ALU1 dimensions, which means the innermost weight is a adhesive weight on the inner rim lip and the outermost weight is an adhesive weight located on an inner surface of the rim.

2) Mount a wheel, dial in the dimensions, and press (start). The wheel does not have to be balanced.

3) After the wheel stops, apply 0.50 oz. of adhesive weights at any angular position at the dialed-in location of the adhesive weight and press (start).

4) After the wheel stops, add 2.5 oz. of adhesive weights to the already applied 0.50 oz. of weights (so that it forms 1 long 3.00 oz. strip) and press (start). The balancer calculates the compensation factors required and returns to the normal balancing mode automatically.

5) Remove the 3.00 oz. of adhesive weights.

Other weight curve calibration programs could be used for various types of correction weights. To save the user from this procedure (and the possibility of doing it wrong), the wheel balancer of FIGS. 1–3 has stored in memory the proper compensation factors for every available style of weight. The user can then go into setup mode and advance to the selection of "hammer-on" or "adhesive" weight style desired. Numbers come up on the LED display 25 pertaining to styles of weights, and the user simply presses (enter) while the desired weight style number is shown to make the machine use curvature compensation for that style weight.

The more complicated multiple spin procedures above is an alternative method of accomplishing the same thing.

When the split weight mode of operation of the balancer of FIGS. 1–3 is used, the compensation due to weight curvature differs from that described above. Since in the split weight mode, the user chooses an incremental weight as two weights, each of these incremental weights must be REVERSE-CURVE compensated. That is, it is necessary to find out what effective weight would have to exist to produce the incremental weight applied on the wheel curvature presented from the split.

The equation for a hammer-on weight weight at 14" diameter is:

$$\text{effective weight} = (\text{weight-on-curve} - 1.25 \text{ oz.}) * 0.95 + 1.25 \text{ oz.}$$

The angle displacement between the split weights is calculated by DSP 23 based on the effective weights and not on the stamped sizes. Without compensation, residual imbalance would certainly exist since the angle displacement between the applied weights would be too far apart.

In view of the above it will be seen that the objects and features of the present invention are achieved and other advantageous results obtained. It is not intended that the present invention be limited by the specification and drawings, which are merely illustrative, but only by the appended claims.

What is claimed is:

1. Apparatus for balancing a wheel and tire assembly comprising:

means for sensing imbalance of a wheel and tire assembly;

means responsive to said sensing means for determining the magnitude and placement of at least one correction weight to correct the imbalance, said determining means further including means for compensating the determined magnitude of the correction weight to correct for curvature of said correction weight;

means for displaying to a user the compensated magnitude of the correction weight;

manually operable means for entering the diameter of the wheel being balanced, said determining means having stored therein different compensation factors for different wheel diameters;

said determining means being responsive to the entered wheel diameter and to the correction weight to compensate for curvature, for an entered wheel diameter, only said at least one correction weight heavier than a predetermined minimum correction weight limit, each of a plurality of wheel diameters having associated therewith its own said predetermined minimum correction weight limit above which compensation occurs.

2. The wheel and tire assembly balancing apparatus as set forth in claim 1 wherein said predetermined minimum correction weight limit above which compensation occurs for a wheel having a first diameter smaller than said predetermined minimum correction weight limit for wheels having diameters larger than said first diameter.

3. Apparatus for balancing a wheel and tire assembly comprising:

means for sensing imbalance of a wheel and tire assembly:

means responsive to said sensing means for determining the magnitude and placement of at least one correction weight to correct the imbalance, said determining means further including means for compensating the determined magnitude of the correction weight to correct for curvature of said correction weight;

means for displaying to a user the compensated magnitude of the correction weight;

manually operable means for entering the diameter of the wheel being balanced, said determining means having stored therein different compensation factors for different wheel diameters;

said different compensation factors for wheel diameters corresponding to different wheel diameters separated by one inch increments.

4. Apparatus for balancing a wheel and tire assembly comprising:

means for sensing imbalance of a wheel and tire assembly;

means responsive to said sensing means for determining the magnitude and placement of at least one correction weight to correct the imbalance, said determining means further including means for linearly compensating the magnitude of the correction weight to correct for curvature of correction weights; and means for displaying to a user the compensated magnitude of the correction weight;

said means for compensating takes the form of $C.W. = (I.W. - P.W.) * C.F. + P.W.$, where C.W. is the compensated weight, I.W. is the calculated balancing weight without compensation for curvature, P.W. is a predetermined weight below which no compensation takes place, and C.F. is a compensation factor.

5. The wheel and tire assembly balancing apparatus as set forth in claim 4 wherein C.F. varies with different wheel diameters and weight types.

6. The wheel and tire assembly balancing apparatus as set forth in claim 4 wherein C.F. varies for adhesive weights and hammer-on weights for the same wheel diameter.

7. The wheel and tire assembly balancing apparatus as set forth in claim 4 wherein P.W. varies for adhesive weights and hammer-on weights for the same wheel diameter.

8. The wheel and tire assembly balancing apparatus as set forth in claim 4 further including manually operable means for selecting the type of correction weight being used, said compensating means being responsive to the selection of a particular type of correction weight to use the P.W. and C.F. for that particular type of correction weight in compensating for curvature of said weight.

9. Apparatus for balancing a wheel and tire assembly comprising:

means for sensing imbalance of a wheel and tire assembly;

means for determining the magnitude and placement of at least a single correction weight to substantially correct the imbalance;

means for providing a split weight signal to said determining means, said determining means being responsive to the split weight signal to determine for said single correction weight a pair of correction weights having weight magnitudes and weight placements which are vectorially equivalent to the corresponding single correction weight in terms of correcting imbalance, said determining means including means for compensating said weight magnitudes and weight placements to correct for curvature of the pair of correction weights;

said determining means compensating by calculating the effective weights of the pair of correction weights and determining the placements of said pair of correction weights corresponding to the calculated effective weights;

said effective weights being determined by the determining means as a linear function of the pair of correction weights.

10. Apparatus for balancing a wheel and tire assembly comprising:

means for sensing imbalance of a wheel and tire assembly:

means for determining the magnitude and placement of at least a single correction weight to substantially correct the imbalance;

means for providing a split weight signal to said determining means, said determining means being responsive to the split weight signal to determine for said single correction weight a pair of correction weights having weight magnitudes and weight placement which are vectorially equivalent to the corresponding single correction weight in terms of correcting imbalance, said determining means including means for compensating said weight magnitudes and weight placements to correct for curvature of the pair of correction weights;

said determining means compensating by calculating the effective weights of the pair of correction weights and determining the placements of said pair of correction weights corresponding to the calculated effective weights;

said determining means compensating for curvature of the pair of correction weights only when a correction weight exceeds a predetermined weight.

11. The wheel and tire assembly balancing apparatus as set forth in claim 10 wherein the predetermined weight varies with wheel diameter and weight type.

12. A method of balancing a wheel and tire assembly comprising:

sensing imbalance of a wheel and tire assembly;

determining from the sensed imbalance the magnitude and placement of at least one correction weight to correct the imbalance;

compensating the determined magnitude of the correction weight to correct for curvature of said correction weight; and displaying to a user the compensated magnitude of the correction weight to enable the user to place a correction weight of the compensated magnitude on the wheel and tire assembly;

compensating the magnitude of the correction weight for actual weight curvature by different amounts for different wheel diameters only for the correction weight above a predetermined minimum correction weight limit.

13. The method of balancing a wheel and tire assembly as set forth in claim 12 wherein said predetermined minimum correction weight limit at which compensation for weight curvature begins varies with wheel diameter and weight type.

14. The method of balancing a wheel and tire assembly as set forth in claim 13 wherein said predetermined minimum correction weight limit for a wheel having a first diameter is smaller than the predetermined minimum weight limit for wheels having diameters larger than said first diameter.

15. A method of balancing a wheel and tire assembly comprising:

sensing imbalance of a wheel and tire assembly;

determining from the sensed imbalance the magnitude and placement of at least one correction weight to correct the imbalance;

compensating the determined magnitude of the correction weight to correct for curvature of said correction weight; and displaying to a user the compensated magnitude of the correction weight to enable the user to place a correction weight of the compensated magnitude on the wheel and tire assembly, compensating the magnitude of the correction weight for actual weight curvature by different amounts for different wheel diameters;

and having a different compensation factors for different wheel diameters corresponding to wheel diameters separated by one inch increments.

16. A method of balancing a wheel and tire assembly comprising:

sensing imbalance of a wheel and tire assembly;

determining from the sensed imbalance the magnitude and placement of at least one correction weight to correct the imbalance;

linearly compensating the magnitude of the correction weight to correct for curvature of said correction weight; and displaying to a user the compensated magnitude of the correction weight to enable the user to place a correction weight of the compensated magnitude on the wheel and tire assembly;

said compensating takes the form of C.W.=(I.W.−P.W.) * C.F.+P.W., where C.W. is the compensated weight, I.W. is the calculated balancing weight without compensation for curvature, P.W. is a predetermined weight below which no compensation takes place, and C.F. is a compensation factor.

17. The method of balancing a wheel and tire assembly as set forth in claim 16 wherein C.F. varies with different wheel diameters and weight type.

18. The method of balancing a wheel and tire assembly as set forth in claim 16 wherein C.F. varies for adhesive weights and hammer-on weights for the same wheel diameter.

19. The method of balancing a wheel and tire assembly as set forth in claim 16 wherein P.W. varies for adhesive weights and hammer-on weights for the same wheel diameter.

20. The method of balancing a wheel and tire assembly as set forth in claim 16 further including manually selecting the type of correction weight being used, and using the P.W. and C.F. for that particular type of correction weight in compensating for curvature of said weight.

21. A method of balancing a wheel and tire assembly comprising:

sensing imbalance of a wheel and tire assembly;

determining the magnitude and placement of at least a single correction weight to substantially correct the imbalance;

determining for said single correction weight a pair of correction weights having weight magnitudes and weight placements which are vectorially equivalent to the corresponding single correction weight in terms of correcting imbalance, said weight magnitudes and weight placements being corrected for curvature of the pair of correction weights; and calculating the effective weight of said pair of correction weights and determining the placement of said pair of correction weights corresponding to the calculated effective weights.

22. The method of balancing a wheel and tire assembly as set forth in claim 21 wherein the effective weights are linear functions of the actual weights.

23. The method of balancing a wheel and tire assembly as set forth in claim 21 including compensating for curvature of the correction weights only when a correction weight exceeds a predetermined weight.

24. The method of balancing a wheel and tire assembly as set forth in claim 23 wherein the predetermined weight varies with wheel diameter and weight type.

* * * * *